United States Patent
Charles

(10) Patent No.: US 10,441,990 B2
(45) Date of Patent: Oct. 15, 2019

(54) CROSSBAR SUPPORT ASSEMBLIES, BOLSTER CART ASSEMBLIES, AND METHODS OF ADJUSTING A DATUM FOR LOCATING A CROSSBAR

(71) Applicant: Toyota Motor Engineering & Manufacturing North America, Inc., Erlanger, KY (US)

(72) Inventor: Thoney R. Charles, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/824,561

(22) Filed: Nov. 28, 2017

(65) Prior Publication Data

US 2019/0160514 A1    May 30, 2019

(51) Int. Cl.
  *B65G 21/10* (2006.01)
  *B65G 21/20* (2006.01)
  *B21D 43/05* (2006.01)
  *B21D 43/10* (2006.01)

(52) U.S. Cl.
  CPC ........... *B21D 43/052* (2013.01); *B21D 43/10* (2013.01); *B65G 21/10* (2013.01); *B65G 21/2045* (2013.01)

(58) Field of Classification Search
  CPC . B65G 21/10; B65G 21/2072; B65G 21/2045
  USPC ..................................................... 198/836.3
  See application file for complete search history.

(56) References Cited

U.S. PATENT DOCUMENTS

| 2,094,798 | A | | 10/1937 | Kehrbeck | |
|---|---|---|---|---|---|
| 2,229,605 | A | * | 1/1941 | Snyder | B65G 21/2072 198/836.3 |
| 3,776,350 | A | * | 12/1973 | Tice | B65G 21/2072 198/836.3 |
| 4,470,499 | A | * | 9/1984 | Sijbrandij | B65G 21/06 198/836.3 |
| 5,676,239 | A | * | 10/1997 | Mason | B65G 21/2072 198/836.1 |
| 5,927,480 | A | * | 7/1999 | McCaffrey | B65G 21/2072 198/836.3 |
| 6,427,829 | B1 | * | 8/2002 | Ledingham | B65G 21/2072 198/836.3 |
| 2003/0205447 | A1 | * | 11/2003 | Ledingham | B65G 21/06 198/836.3 |

(Continued)

FOREIGN PATENT DOCUMENTS

| GB | 599603 A | 3/1948 |
|---|---|---|
| GB | 725224 A | 3/1955 |

*Primary Examiner* — James R Bidwell
(74) *Attorney, Agent, or Firm* — Dinsmore & Shohl LLP

(57) ABSTRACT

A crossbar support assembly that supports a crossbar includes a support post, a bracket, a riser, and a lock assembly. The bracket is secured to a distal end of the support post. The lock assembly is configured to releasably secure the riser to the bracket. The lock assembly includes a locked configuration and an unlocked configuration. In the locked configuration the riser is inhibited from moving with respect to the bracket. In the unlocked configuration the riser is permitted to move with respect to the bracket. The crossbar support assembly may include an adjustment assembly that adjusts a position of the riser with respect to the bracket when the lock assembly is in the unlocked configuration.

18 Claims, 8 Drawing Sheets

(56) References Cited

U.S. PATENT DOCUMENTS

| | | | |
|---|---|---|---|
| 2008/0116042 A1* | 5/2008 | McAlister | B65G 21/2072 198/836.3 |
| 2008/0197000 A1* | 8/2008 | Andreoli | B65G 21/2054 198/836.3 |
| 2014/0110228 A1* | 4/2014 | Franzaroli | B65G 15/44 198/836.3 |

* cited by examiner

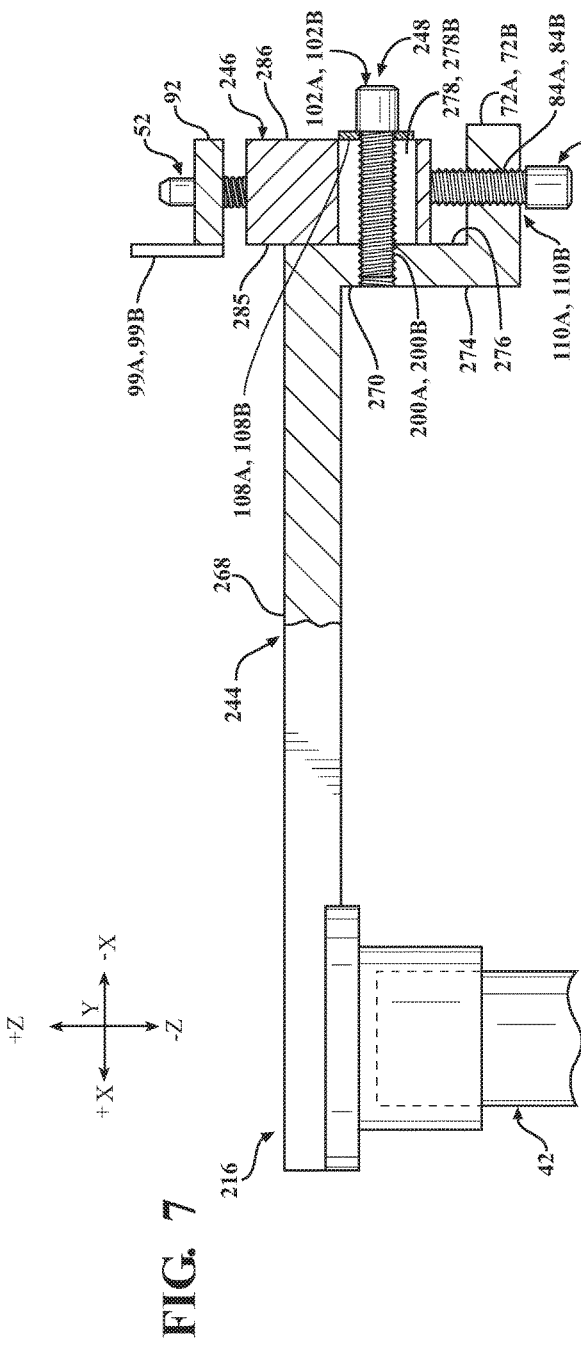
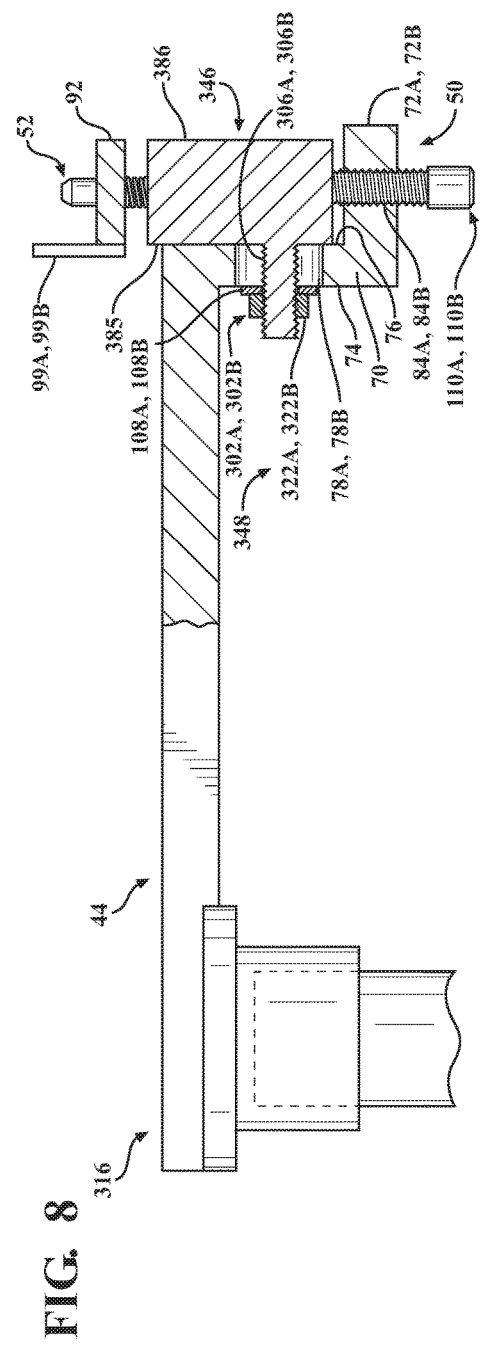
FIG. 7
FIG. 8

CROSSBAR SUPPORT ASSEMBLIES, BOLSTER CART ASSEMBLIES, AND METHODS OF ADJUSTING A DATUM FOR LOCATING A CROSSBAR

TECHNICAL FIELD

The present specification generally relates to crossbar support assemblies for bolster cart assemblies used in transfer press assemblies, more specifically, crossbar support assemblies that adjust a datum for locating a crossbar in a transfer press assembly.

BACKGROUND

There are currently transfer press assemblies that include a plurality of bolster carts that each operate as press stations. The press station at each of the bolster carts sequentially forms a shape into a work piece until the work piece attains a final shape. A crossbar transfer mechanism is used to sequentially move the work piece from a starting press station to a final press station. The crossbar transfer mechanism manipulates a crossbar between the bolster cart press stations of the transfer press assembly. The crossbar transfer mechanism engages with the crossbar from a crossbar supporter located on the bolster cart. After completion of the pressing operations, the crossbar transfer mechanism returns the crossbar to the crossbar supporter and the crossbar transfer mechanism disengages from the crossbar.

As the crossbar transfer mechanism engages and disengages with the crossbar when the crossbar is on the crossbar supporter, a datum is provided on the crossbar supporter to position the crossbar in a predetermined location. Under repeated operations, the crossbar supporter may become bent and the datum is moved from a predetermined location. As the datum is moved from the predetermined location, the crossbar transfer mechanism is unable to accurately align with the crossbar to engage the crossbar or return the crossbar to the crossbar supporter.

Accordingly, a need exists for alternative assemblies that allow for the adjustment of a datum that is utilized by the crossbar transfer mechanism to the crossbar.

SUMMARY

In accordance with one embodiment, a crossbar support assembly is provided. The crossbar support assembly supports a crossbar. The crossbar support assembly includes a support post, a bracket, a riser, and a lock assembly. The bracket is secured to a distal end of the support post. The riser includes a datum configured to locate the crossbar in a predetermined location. The lock assembly is configured to releasably secure the riser to the bracket. The lock assembly includes a locked configuration and an unlocked configuration. In the locked configuration the riser is inhibited from moving with respect to the bracket. In the unlocked configuration the riser is permitted to move with respect to the bracket. The crossbar support assembly may include an adjustment assembly that adjusts a position of the riser with respect to the bracket when the lock assembly is in the unlocked configuration.

In accordance with another embodiment, a bolster cart assembly for use in a transfer press assembly is provided. The bolster cart assembly includes a bolster cart and a crossbar, and a crossbar support assembly. The bolster cart is configured to receive a bolster. The crossbar support assembly is configured to support the crossbar. The crossbar support assembly includes a support post, a bracket, a riser, and a lock assembly. The support post is connected to the bolster cart. The support post includes a distal end. The bracket is secured to the distal end of the support post. The riser includes a datum configured to locate the crossbar in a predetermined location. The lock assembly is configured to releasably secure the riser to the bracket. The lock assembly includes a locked configuration and an unlocked configuration. In the locked configuration the riser is inhibited from moving with respect to the bracket. In the unlocked configuration the riser is permitted to move with respect to the bracket. The crossbar support assembly of the bolster cart assembly may include an adjustment assembly that adjusts a position of the riser with respect to the bracket when the lock assembly is in the unlocked configuration.

In accordance with another embodiment, a method of adjusting a datum that locating a crossbar on a support post of a bolster cart for use in a transfer press assembly is provided. The datum is disposed on a riser that is connected to a bracket by a lock assembly. The datum is configured to locate the crossbar in a predetermined location. The bracket is secured to a distal end of the support post that extends from the bolster cart. The method includes switching the lock assembly from a locked configuration to an unlocked configuration. The lock assembly connects the riser to the bracket that is secured to the distal end of the support post. In the locked configuration the riser is inhibited from moving with respect to the bracket. In the unlocked configuration the riser is permitted to move with respect to the bracket. The method also includes actuating an adjustment assembly that adjusts a position of the riser with respect to the bracket when the lock assembly is in the unlocked configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 schematically depicts a partial cross-sectional view of an alternative crossbar support assembly with a lock assembly in a locked configuration, according to one or more embodiments shown and described herein; and FIG. 8 schematically depicts a partial cross-sectional view of an alternative crossbar support assembly with a lock assembly in a locked configuration, according to one or more embodiments shown and described herein.

DETAILED DESCRIPTION

Figure 1:
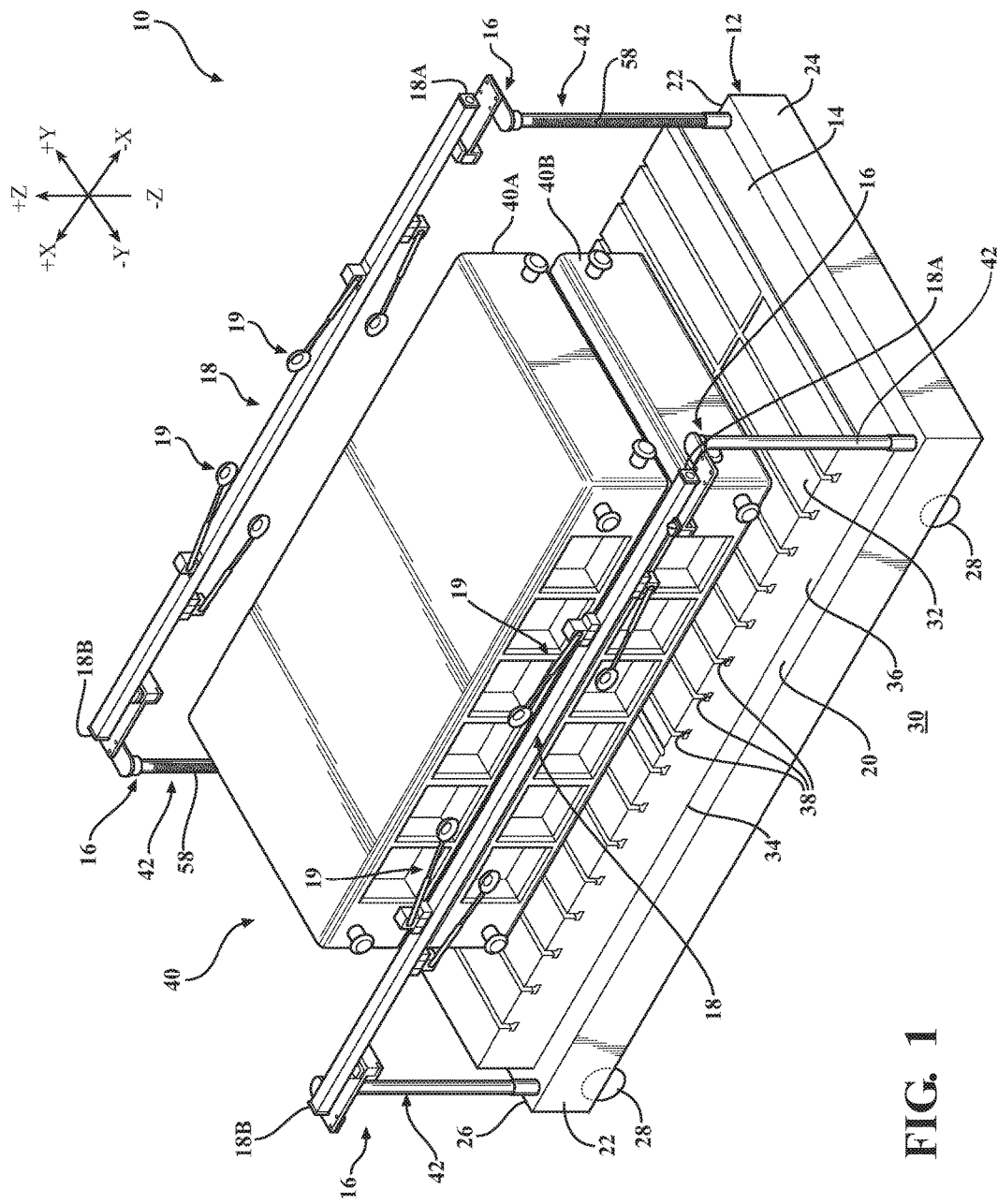
FIG. 1 schematically depicts a perspective view of a bolster cart assembly having a crossbar support assembly for use in a transfer press assembly, according to one or more embodiments shown and described herein.

FIG. 1 generally depicts a bolster cart assembly having a crossbar support assembly for use in a transfer press assembly. Embodiments disclosed herein include bolster cart assemblies that include crossbar support assemblies for adjusting a location of a datum configured to locate a crossbar that is removably supported by the crossbar support assembly. The bolster cart assembly generally comprises a bolster cart, a bolster, a crossbar, and a crossbar support assembly. The crossbar support assembly includes a support post, a bracket, a riser, and a lock assembly. Various embodiments of the assemblies and the operation of adjusting a datum for locating a crossbar are described in more detail herein.

During operation of the transfer press assembly, a crossbar transfer mechanism connects to the crossbar supported by the crossbar support assembly. After repeated transfer operations, the crossbar supporter assembly may be bent which displaces the datum for locating the crossbar from a predetermined location. As the datum for locating the crossbar is displaced, the crossbar transfer mechanism is unable to engage the crossbar as the crossbar has been displaced from the predetermined location.

Previous transfer press assembly, required disassembly of the crossbar support assembly, realignment of the datum for locating the crossbar into the predetermined location, and reassembly of the crossbar support assembly. The realignment of the datum for locating the crossbar into the predetermined location may be performed by trial and error, which required repeated disassembly, realignment, and reassembly operations in order to restore the datum into the predetermined location. As such, the realignment of the datum for locating the crossbar in the previous transfer press assemblies were time consuming operations.

Embodiments of the present disclosure are directed to crossbar support assemblies, bolster cart assemblies, and methods for adjusting a datum for locating a crossbar by switching the lock assembly from the locked configuration to the unlocked configuration, and actuating the adjustment mechanism to adjust the location of the riser. Once the riser, to which the datum for locating the crossbar is connected, is positioned to the predetermined location, the lock assembly is switched from the unlocked position to the locked position. As such, the adjustment of the datum for locating the crossbar can be adjusted into the predetermined location without disassembly and reassembly of the crossbar support assembly.

In some embodiments, the datum for locating the crossbar is connected to the riser that is releasably secured to the bracket by the lock assembly that includes a locked configuration and an unlocked configuration. In the locked configuration, the riser is inhibited from moving with respect to the bracket. In the unlocked configuration, the riser is permitted to move with respect to the bracket. As the datum for locating the crossbar is connected to the riser, the datum can be adjusted by movement of the riser when the lock assembly is in the unlocked configuration.

In some embodiments, the crossbar support assembly includes an adjustment assembly that adjusts the location of the riser with respect to the bracket when the lock assembly is in the unlocked position. Specifically, the datum for locating the crossbar can be adjusted by actuating the adjustment assembly to move the riser with respect to the bracket when the lock assembly is in the unlocked position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, the term "bolster cart longitudinal direction" refers to the forward-rearward direction of the bolster cart (i.e., in the +/−X direction depicted in FIG. 1). The term "bolster cart lateral direction" refers to the cross-bolster cart direction (i.e., in the +/−Y direction depicted in FIG. 1), and is transverse to the bolster cart longitudinal direction. The term "bolster cart vertical direction" refers to the upward-downward direction of the bolster cart (i.e., in the +/−bolster cart Z direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward" as used herein refers to the relative location of a component with respect to a bolster cart centerline. The term "inboard" or "inward" as used herein refers to the relative location of a component with respect to the bolster cart centerline. Because the bolster cart structures may be generally symmetrical about the bolster cart centerline, the direction to which use of terms "inboard," "inward," "outboard" and "outward" refer may be mirrored about the bolster cart centerline when evaluating components positioned along opposite sides of the bolster cart.

Figure 2:
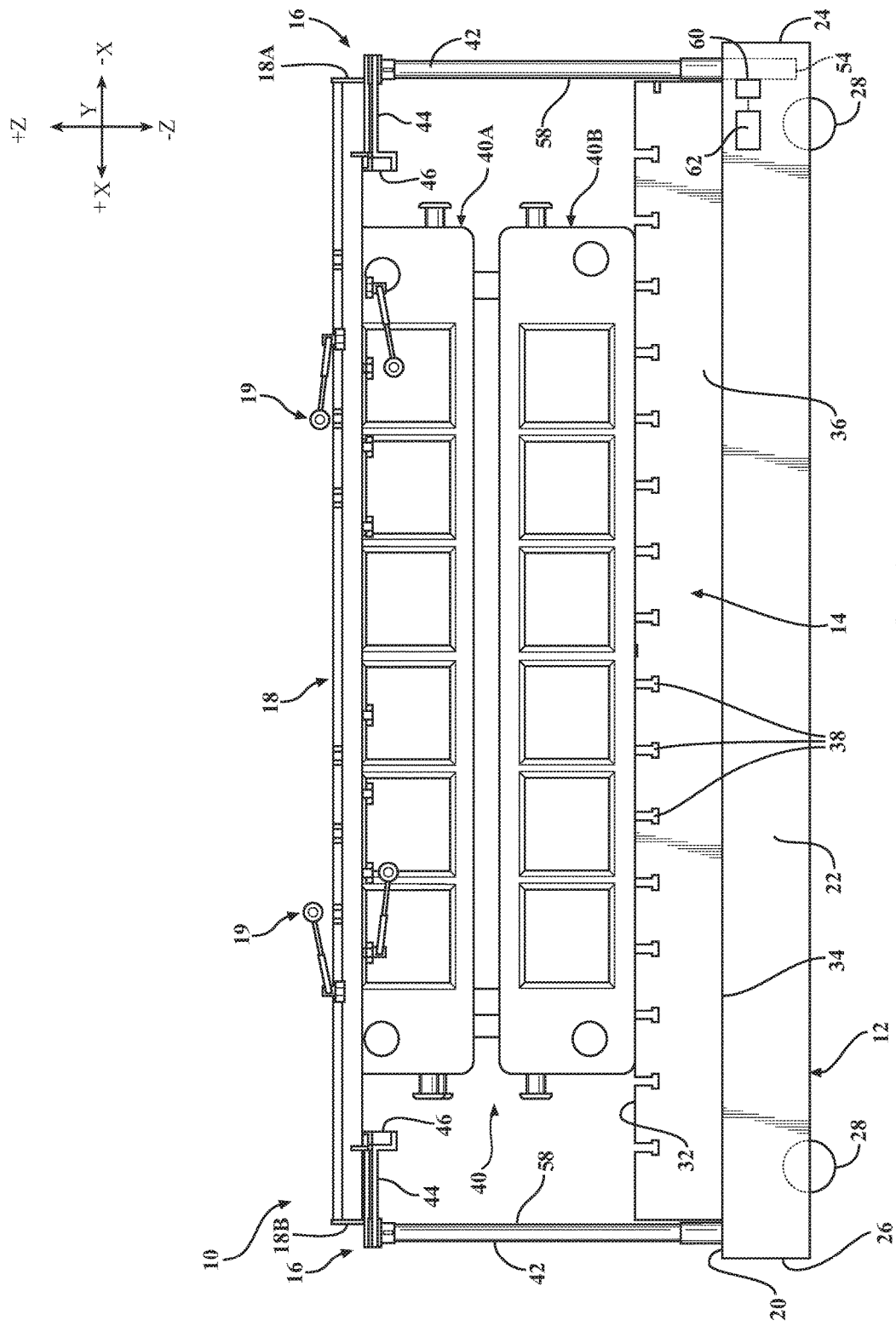
FIG. 2 schematically depicts a side view of the bolster cart assembly of FIG. 1, according to one or more embodiments shown and described herein.

Referring initially to FIGS. 1 and 2, a bolster cart assembly 10 is depicted. The bolster cart assembly 10 includes a bolster cart 12, a bolster 14, crossbar support assemblies 16, and crossbars 18. The crossbars 18 includes ends 18A, 18B and at least one suction cup assembly 19 positioned between the ends 18A, 18B. The suctions cup assemblies 19 are used to attach the work piece to the crossbars 18. As will be described in greater detail below, the crossbars 18 are supported on the crossbar support assemblies 16.

The bolster cart 12 includes an upper surface 20, a pair of sides 22, a first end 24, and an opposite second end 26. The bolster cart 12 may include a plurality of wheels 28 such that the bolster cart 12 is rollable with respect to a floor 30. In some embodiments, the plurality of wheels 28 of the bolster cart 12 engage with a track formed in the floor 30.

The bolster 14 includes an upper die surface 32, an opposite lower cart surface 34, and a pair of sides 36. The bolster 14 is provided on the bolster cart 12 with the lower cart surface 34 contacting the upper surface 20 of the bolster cart 12. The bolster 14 may include a plurality of inverted T-shaped grooves 38 that extend parallel to the bolster cart lateral direction and open on the to the upper die surface 32. In some embodiments, the plurality of inverted T-shaped grooves 38 extend between the pair of sides 36 of the bolster 14 parallel to the bolster cart lateral direction.

A press die 40 is provided on the bolster 14. The press die 40 includes an upper press die 40A and a lower press die 40B. The lower press die 40B is provided on the upper die surface 32 of the bolster 14. The upper press die 40A is positioned on top of the lower press die 40B. As will be described in greater detail below, the upper press die 40A and the lower press die 40B operate to form a shape into a work piece during the transfer press operation.

In some embodiments, the lower press die 40B includes a plurality of inverted T-shaped projections (not shown) that are received within the plurality of inverted T-shaped grooves 38. The engagement of the plurality of inverted T-shaped projections of the lower press die 40B and the plurality of inverted T-shaped grooves 38 of the bolster 14 prevents the lower press die 40B from moving parallel to the bolster cart longitudinal direction during operation.

The crossbar support assembly 16 is provided at the first end 24 and at the second end 26 of each of the pair of sides 22 of the bolster cart 12. The crossbar support assemblies 16 support the crossbar 18 when the crossbar 18 is in the predetermined location, as shown in FIGS. 1 and 2. In some embodiments, the bolster cart assembly 10 includes a pair of crossbars 18. One of the pair of crossbars 18 is supported by a crossbar support assembly 16 provided at the first end 24 and a crossbar support assembly 16 provided at the second end 26 of one of the pair of sides 22 of the bolster cart 12. The other of pair of crossbars 18 is supported by a crossbar support assembly 16 provided at the first end 24 and a crossbar support assembly 16 provided at the second end 26 of the other of the pair of sides 22 of the bolster cart 12.

It should be appreciated that the location of the crossbar support assemblies 16 is not limited to the illustrated embodiment shown in FIGS. 1 and 2. In some other embodiments, the bolster cart assembly 10 may include crossbar support assemblies 16 that are provided a predetermined distance from the first end 24 and the second end 26 on each of the pair of sides 22 of the bolster cart 12. In some other embodiments, a single or a plurality of crossbar support assemblies 16 may be provided on each of the pair of sides 22 of the bolster cart 12.

Figure 3:
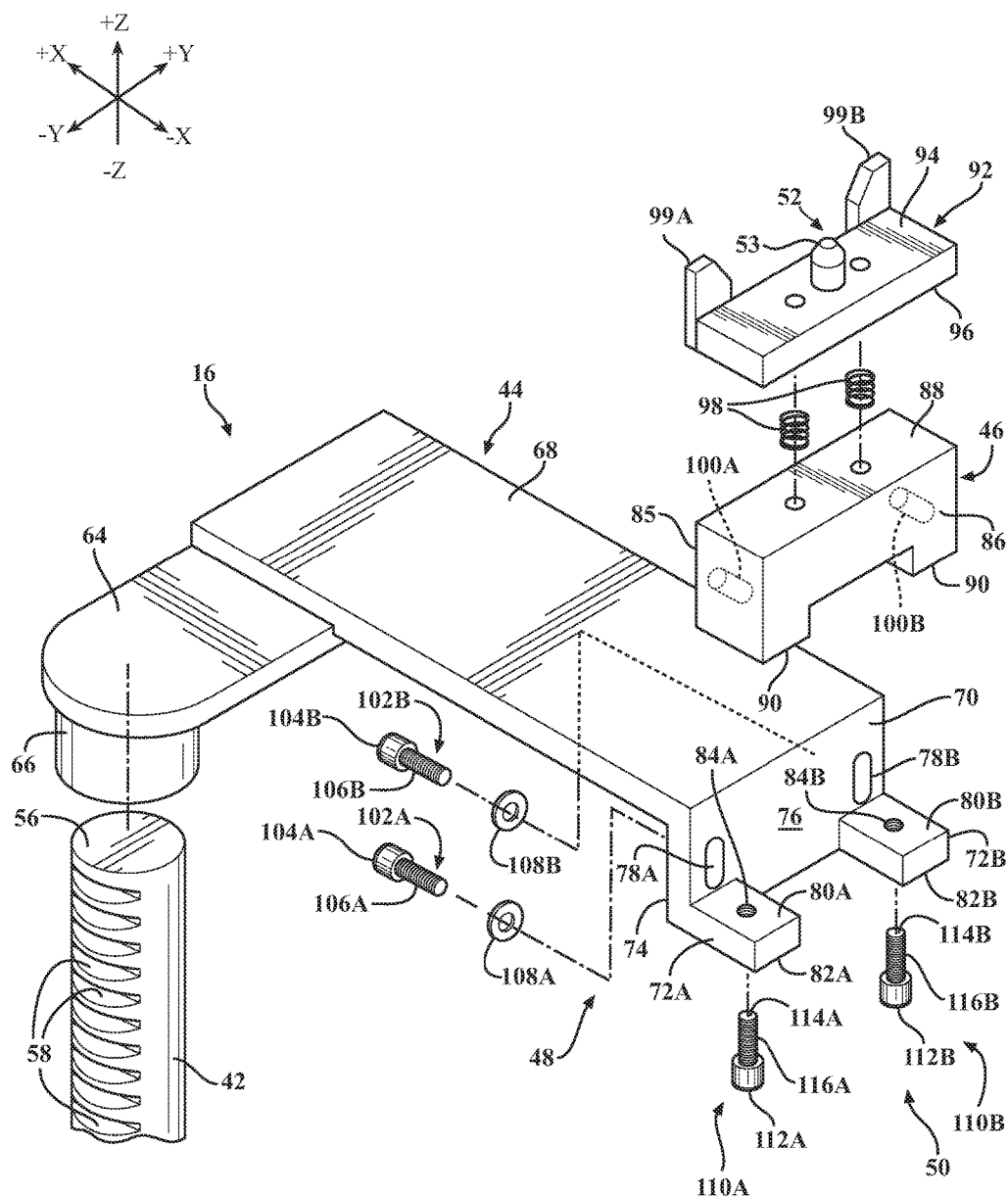
FIG. 3 schematically depicts an exploded perspective view of the crossbar support assembly of FIG. 1, according to one or more embodiments shown and described herein.

Referring to FIGS. 1, 2, and 3, each of the crossbar support assemblies 16 includes a support post 42, a bracket 44, a riser 46, a lock assembly 48, an adjustment assembly 50, and a datum 52 for locating the crossbar 18 in the predetermined location. The support post 42 extends upwardly from the upper surface 20 of the bolster cart 12. The support post 42 includes a proximate end 54 and an opposite distal end 56. A portion of the support post 42 extends through an opening formed in the upper surface 20 of the bolster cart 12 such that the proximate end 54 is provided below the upper surface 20.

A portion of the support post 42 includes a rack gear 58 that engages with a pinion gear 60 positioned below the upper surface 20 of the bolster cart 12. As will be discussed in greater detail below, the pinion gear 60 is attached to a motor 62 that rotates the pinion gear 60 that engages with the rack gear 58 to operate as a rack and pinion assembly to raise and lower the distal end 56 of the support post 42 with respect to the upper surface 20 of the bolster cart 12.

Figure 4A:
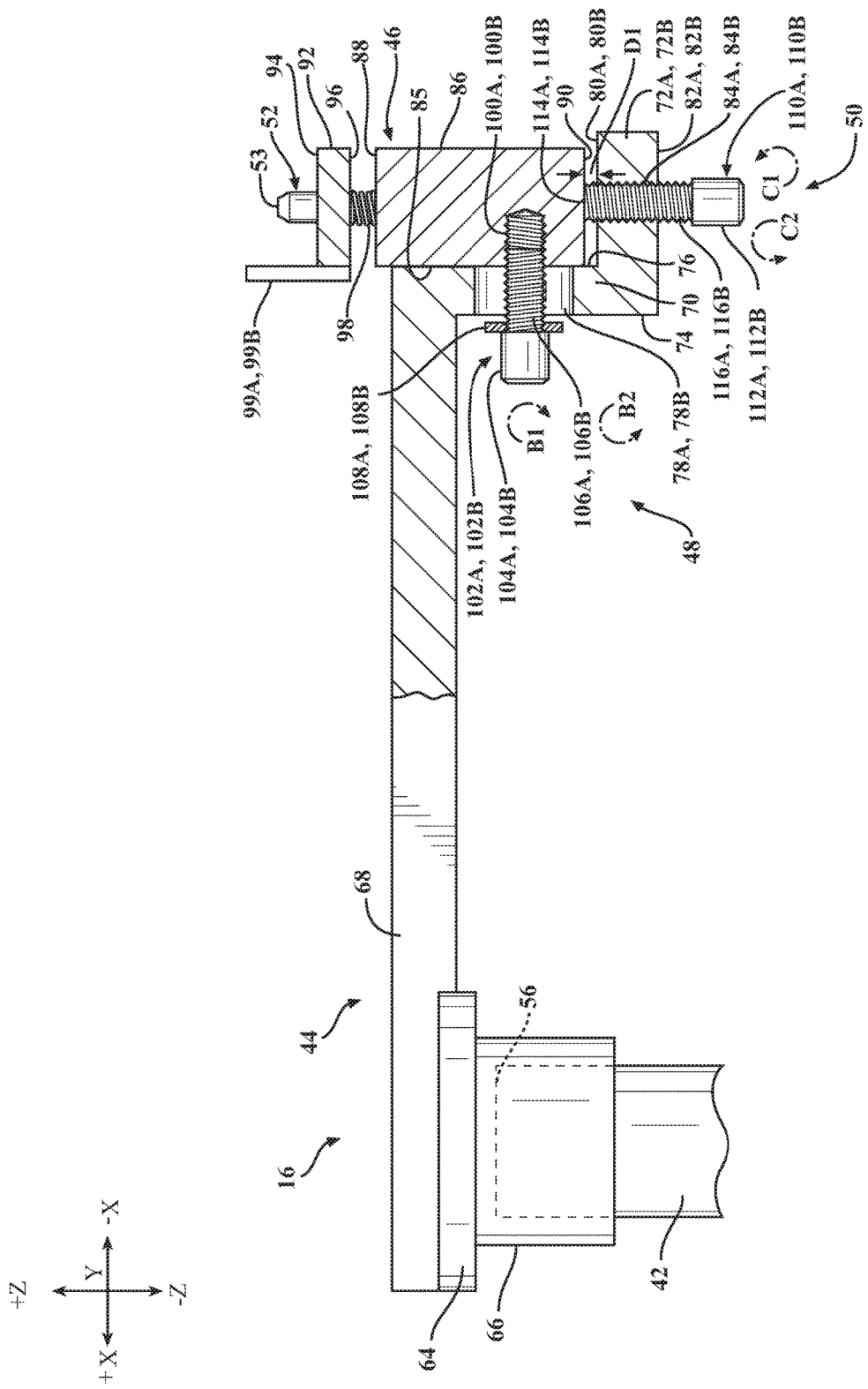
FIG. 4A schematically depicts a partial cross-sectional view of the crossbar support assembly of FIG. 1 with a lock assembly in an unlocked configuration, according to one or more embodiments shown and described herein.
Figure 4B:
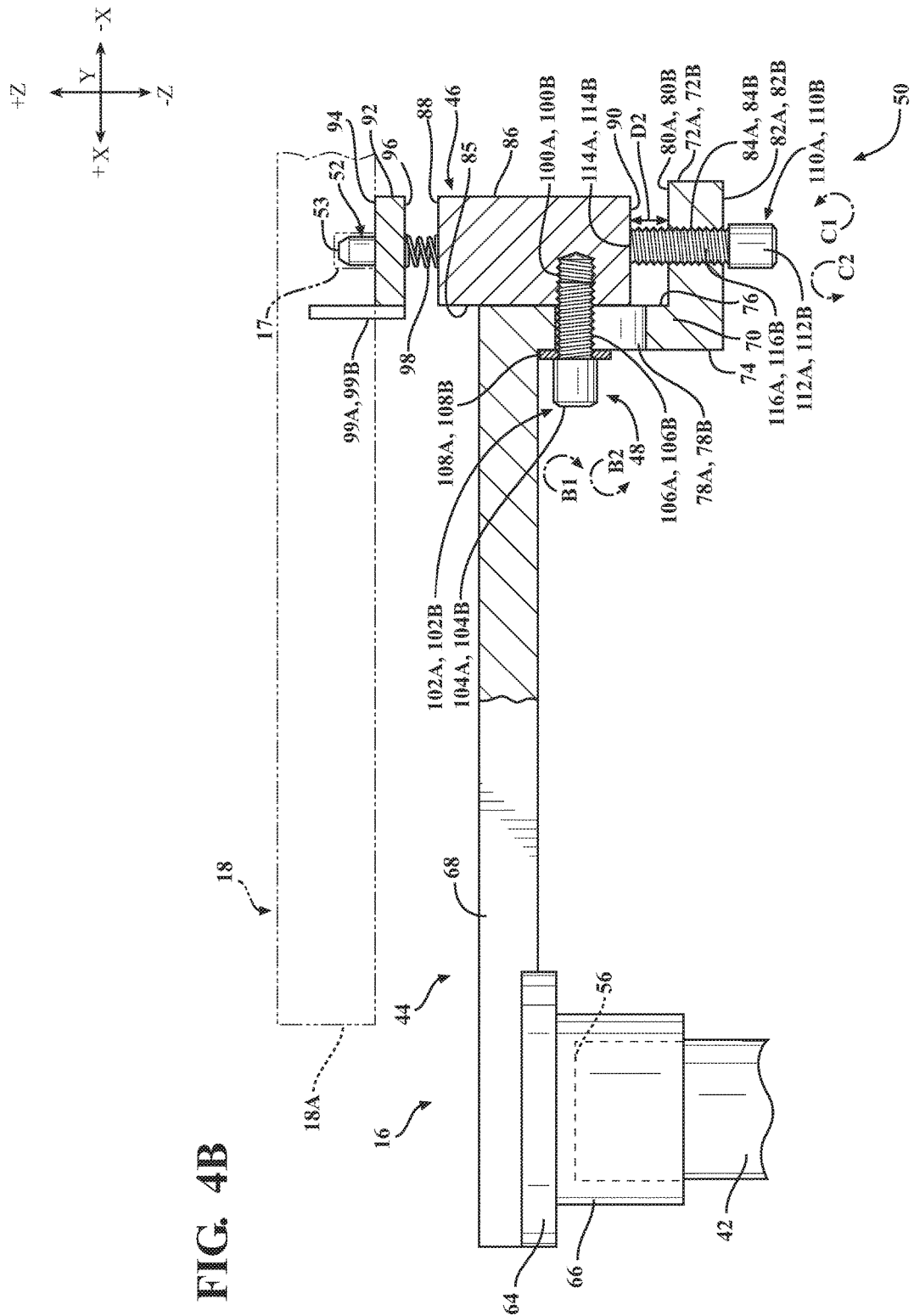
FIG. 4B schematically depicts a partial cross-sectional view of the crossbar support assembly of FIG. 1 with the lock assembly in a locked configuration, according to one or more embodiments shown and described herein.

Referring to FIGS. 3, 4A, and 4B, the bracket 44 is secured to the support post 42 by a support arm 64 that includes an end cap 66. The end cap 66 defines a cavity that corresponds to a shape of the distal end 56 of the support post 42. The support arm 64 extends outwardly from the end cap 66 in a direction parallel to the bolster cart lateral direction. The support arm 64 connects to the bracket 44. In some embodiments, the end cap 66 is welded or fastened to the distal end 56 of the support post 42. In some other embodiments, the bracket 44 is connected directly to the distal end 56 of the support post 42.

The bracket 44 includes a base wall 68, a sidewall 70, and a pair of protrusions 72A, 72B. The base wall 68 is secured to the support arm 64. The base wall 68 extends outwardly from the support arm 64 in a direction parallel to the bolster cart longitudinal direction. The sidewall 70 includes an interior surface 74 and an opposite exterior surface 76. The sidewall 70 extends generally normal from the base wall 68 in a direction parallel to the bolster cart vertical direction. Specifically, the sidewall 70 extends downwardly parallel to the bolster cart vertical direction from the base wall 68. A pair of elongated slots 78A, 78B is formed in the sidewall 70. The elongated slots 78A, 78B extend between the interior surface 74 and the exterior surface 76 of the sidewall 70. The elongated slots 78A, 78B are oriented such that an elongated direction of the elongated slots 78A, 78B extends parallel with the bolster cart vertical direction.

The protrusions 72A, 72B extend outwardly from the exterior surface 76 of the sidewall 70. Specifically, the protrusions 72A, 72B extend outwardly parallel to the bolster cart longitudinal direction. The protrusions 72A, 72B include an upper wall 80A, 80B and an opposite lower wall 82A, 82B. The protrusions 72A, 72B include internally threaded through-bores 84A, 84B, respectively. The internally threaded through-bores 84A, 84B extend between the upper wall 80A, 80B and the lower wall 82A, 82B of the protrusions 72A, 72B. While two, spaced-apart protrusions 72A and 72B are illustrated, a single, continuous protrusion may be used.

The riser 46 includes an interior wall 85, an opposite exterior wall 86, a top wall 88, and an opposite bottom wall 90. The riser 46 includes a pair of internally threaded bores 100A, 100B. The internally threaded bores 100A, 100B are formed in the interior wall 85 of the riser 46 and extend toward the exterior wall 86. In some embodiments, the internally threaded bores 100A, 100B extend only partially through the riser 46 from the interior wall 85 toward the exterior wall 86. In some other embodiments, the internally threaded bores 100A, 100B extend through the riser 46 from the interior wall 85 to the exterior wall 86.

A carriage 92 is connected to the top wall 88 of the riser 46. In some embodiment, the carriage 92 includes an upper surface 94 and an opposite bottom surface 96. In some embodiments, a biasing member 98 is positioned between the top wall 88 of the riser 46 and the bottom surface 96 of the carriage 92. In some embodiments, the biasing member 98 is a coil spring or a resilient material. The biasing member 98 absorbs an impact between the crossbar 18 and the crossbar support assembly 16 so as to facilitate the engagement between the crossbar 18 and the crossbar support assembly 16.

The datum 52 is provided on the upper surface 94 of the carriage 92. Specifically, the datum 52 is formed as a projection that extends upwardly from the carriage 92 in a direction parallel to the bolster cart vertical direction. The datum 52 is shaped as a generally circular rod having a tapered end 53. The carriage 92 includes a pair of guides 99A, 99B. The guides 99A, 99B extend upwardly from the upper surface 94 of the carriage 92. The guides 99A, 99B are spaced apart and the datum 52 is positioned between the pair of guides 99A, 99B in the bolster cart lateral direction. As will be described in greater detail below, the tapered end 53 of the datum 52 and the pair of guides 99A, 99B facilitates the engagement of the crossbar 18 and the datum 52 so as to locate the crossbar 18 onto or off of the crossbar support assemblies 16.

The lock assembly 48 includes a pair of locking fasteners 102A, 102B, the pair of elongated slots 78A, 78B, and the pair of internally threaded bores 100A, 100B. The locking fasteners 102A, 102B include heads 104A, 104B at one end and externally threaded shafts 106A, 106B at an opposite end. In some embodiments, the lock assembly 48 may include washers 108A, 108B through which a portion of the externally threaded shafts 106A, 106B extend. The washers 108A, 108B are positioned on the locking fasteners 102A, 102B between the heads 104A, 104B and the interior surface 74 of the sidewall 70. As will be described in greater detail below, each locking fastener 102A, 102B extends through respective ones of the elongated slots 78A, 78B and into respective ones of the internally threaded bores 100A, 100B.

The adjustment assembly 50 includes a pair of adjustment fasteners 110A, 110B and the pair of internally threaded through-bores 84A, 84B. The locking fasteners 102A, 102B include heads 112A, 112B at one end, contact surfaces 114A, 114B at an opposite end, and externally threaded shafts 116A, 116B extending between the heads 112A, 112B and the contact surfaces 114A, 114B. As will be described in greater detail below, each adjustment fastener 110A, 110B extends through respective ones of the internally threaded through-bores 84A, 84B of the protrusions 72A, 72B and the contact surfaces 114A, 114B abut the bottom wall 90 of the riser 46.

Referring to FIGS. 4A and 4B, an operation of the lock assembly 48 and the adjustment assembly 50 to adjust a position of the datum 52 into the predetermined location. The adjustment of the datum 52 for locating the crossbar 18 will now be described in detail. The lock assembly 48 is moveable between an unlocked configuration, as shown in FIG. 4A, and a locked configuration, as shown in FIG. 4B. In the unlocked configuration of the lock assembly 48, the locking fasteners 102A, 102B extend through the elongated slots 78A, 78B and are at least partially received within the internally threaded bores 100A, 100B. Specifically, at least a portion of the externally threaded shafts 106A, 106B are engaged with at least a portion of the internally threaded bores 100A, 100B such that the riser 46 is connected to the bracket 44 while permitted to move with respect to the bracket 44.

As at least a portion of the externally threaded shafts 106A, 106B are engaged with at least a portion of the internally threaded bores 100A, 100B and the heads 104A, 104B of the locking fasteners 102A, 102B are provided facing the interior wall 85 of the sidewall 70, the locking fasteners 102A, 102B are slidable within the elongated slots 78A, 78B such that the riser 46 is permitted to move with respect to the bracket 44, specifically, the upper wall 80A, 80B of the protrusions 72A, 72B. It is appreciated, of course, that in some embodiments the locking fasteners 102A, 102B may be removed from engagement with the internally threaded bores 100A, 100B in the unlocked configuration.

As shown in FIG. 4A, the bottom wall 90 of the riser 46 is spaced apart from the upper walls 80A, 80B of the protrusions 72A, 72B by a distance D1. As the riser 46 is permitted to move with respect to the upper wall 80A, 80B of the protrusions 72A, 72B when the lock assembly 48 is in the unlocked configuration, the adjustment assembly 50 can be actuated to adjust the distance between the bottom wall 90 of the riser 46 is spaced apart from the upper walls 80A, 80B of the protrusions 72A, 72B. Specifically, the adjustment fasteners 110A, 110B extend through the internally threaded through-bores 84A, 84B and the contact surfaces 114A, 114B contact the bottom wall 90 of the riser 46. At least a portion of the externally threaded shafts 116A, 116B are engaged with at least a portion of the internally threaded through-bores 84A, 84B such that the bottom wall 90 of the riser 46 rests on the contact surfaces 114A, 114B when the lock assembly 48 is in the unlocked configuration.

In order to adjust a linear position of the riser 46, and consequently, the datum 52 for locating the crossbar 18, the adjustment assembly 50 is actuated by rotation of the adjustment fasteners 110A, 110B. Specifically, in order to linearly displace the riser 46 with respect to the bracket 44, the adjustment fasteners 110A, 110B are actuated by being rotated in one of a first direction C1 or in an opposite second direction C2, when the lock assembly 48 is in the unlocked configuration.

The rotation of the adjustment fasteners 110A, 110B in the first direction C1 drives the adjustment fasteners 110A, 110B upwardly in the bolster cart vertical direction through the internally threaded through-bores 84A, 84B such that the contact surfaces 114A, 114B contact the bottom wall 90 of the riser 46 to move the riser 46 upwardly in the bolster cart vertical direction to increase the distance between the upper wall 80A, 80B of the protrusions 72A, 72B and the bottom wall 90 of the riser 46.

The rotation of the adjustment fasteners 110A, 110B in the second direction C2 drives the adjustment fasteners 110A, 110B downwardly in the bolster cart vertical direction through the internally threaded through-bores 84A, 84B such that the contact surfaces 114A, 114B are lowered to move the riser 46 downwardly in the bolster cart vertical direction to decrease the distance between the upper wall 80A, 80B of the protrusions 72A, 72B and the bottom wall 90 of the riser 46. Specifically, as the lock assembly 48 is in the unlocked configuration the riser 46 is linearly displaceable with respect to the sidewall 70 due to the sliding engagement of the locking fasteners 102A, 102B within the elongated slots 78A, 78B. As the riser 46 is supported by the contact surfaces 114A, 114B the lowering of the adjustment fasteners 110A, 110B lowers the riser 46.

The rotation of the adjustment fasteners 110A, 110B in the first direction C1 increases the distance between the upper wall 80A, 80B of the protrusions 72A, 72B and the bottom wall 90 of the riser 46 from the distance D1, as shown in FIG. 4A, to the distance D2 as shown in FIG. 4B. Alternatively, the rotation of the adjustment fasteners 110A, 110B in the second direction C2 decreases the distance between the upper wall 80A, 80B of the protrusions 72A, 72B and the bottom wall 90 of the riser 46 from the distance D2, as shown in FIG. 4B, to the distance D1 as shown in FIG. 4A. Accordingly, the location of the datum 52 in the bolster cart vertical direction can be adjusted upwardly and downwardly in order to position the datum 52 in a predetermined location for use in locating the crossbar 18.

Referring to FIG. 4B, the lock assembly 48 is in the locked configuration. In the locked configuration, the lock assembly 48 inhibits the riser 46 from moving with respect to the bracket 44, specifically the base wall 68 and/or the sidewall 70. In the locked configuration, the locking fasteners 102A, 102B are used to fasten the riser 46 to the bracket 44. Specifically, the locking fasteners 102A, 102B compress the interior wall 85 of the riser 46 against the exterior surface 76 of the sidewall 70 to inhibit the riser 48 from moving with respect to the bracket 44. The lock assembly 48 is switched between the locked configuration and the unlocked configuration by rotation of the locking fasteners 102A, 102B in one of a first direction B1 or a second direction B2. Specifically, the locking fasteners 102A, 102B are rotated in the first direction B1 to switch the lock assembly 48 from the locked configuration to the unlocked configuration. Similarly, the locking fasteners 102A, 102B are rotated in the second direction B2 to switch the lock assembly 48 from the unlocked configuration to the locked configuration.

As shown in FIG. 4B, the crossbar 18 is supported by the crossbar support assembly 16. Specifically, the datum 52 is received within a locating aperture 17 formed on an underside of the crossbar 18. The guides 99A, 99B guide the tapered end 53 of the datum 52 to engage within the locating aperture 17 such that the datum 52 is utilized to locate the crossbar 18 in the predetermined location.

Figure 5A:
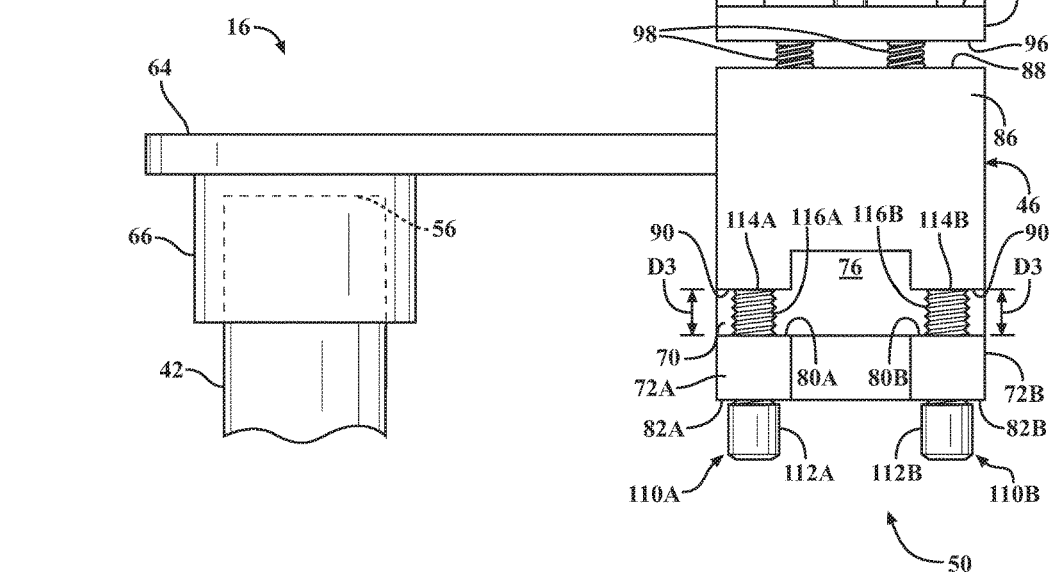
FIG. 5A schematically depicts a partial side view of the crossbar support assembly of FIG. 1 with the adjustment assembly actuated to adjust a height of a datum for locating a crossbar, according to one or more embodiments shown and described herein.
Figure 5B:
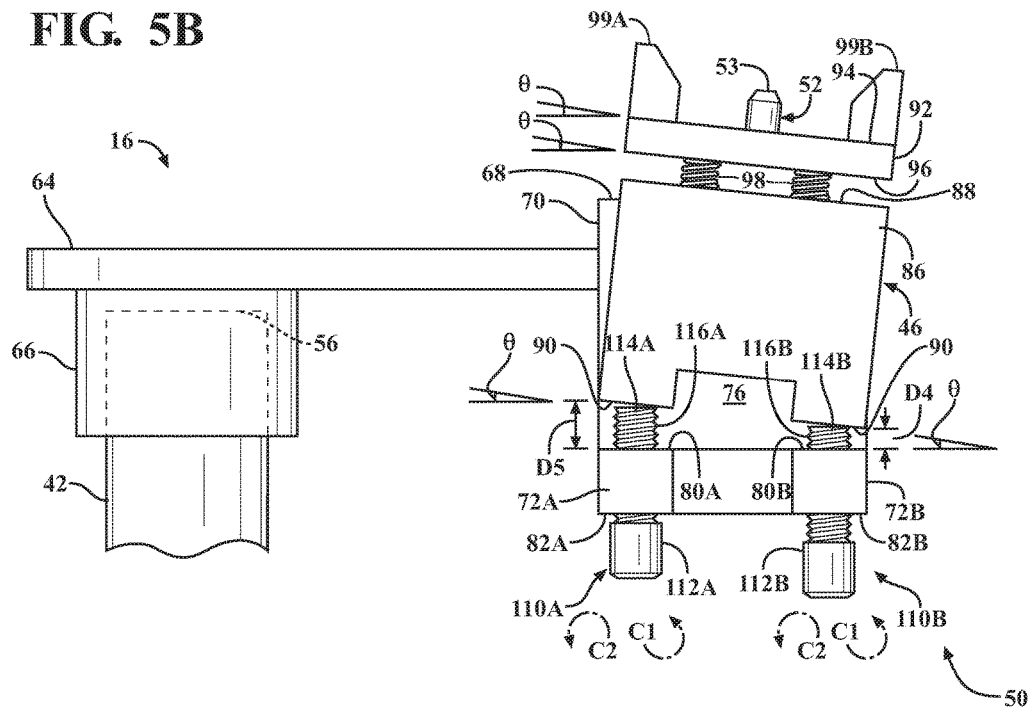
FIG. 5B schematically depicts a partial front view of the crossbar support assembly of FIG. 1 with the adjustment assembly actuated to adjust an angle of the datum for locating the crossbar, according to one or more embodiments shown and described herein.

Referring to FIGS. 5A and 5B, in order to adjust an angular position of the riser 46, and consequently, the datum 52 for locating the crossbar 18, the adjustment assembly 50 is actuated by rotation of one of the adjustment fasteners 110A, 110B. Specifically, in order to angularly displace the top wall 88 or bottom wall 90 of the riser 46 with respect to the upper wall 80A, 80B of the protrusions 72A, 72B, one of the adjustment fasteners 110A, 110B is actuated by being rotated in one of a first direction C1 or in an opposite second direction C2, when the lock assembly 48 is in the unlocked configuration.

As shown in FIG. 5A, the adjustment fasteners 110A, 110B are positioned to engage within the internally threaded through-bores 84A, 84B such that the contact surfaces 114A, 114B are spaced apart from the upper wall 80A, 80B the same distance. As the rotation of the adjustment fasteners 110A, 110B are equal, the distance between the upper wall 80A of the protrusion 72A and the bottom wall 90 is the same as the distance between the upper wall 80B of the protrusion 72B and the bottom wall 90. Specifically, the upper wall 80A of the protrusion 72A and the bottom wall 90 are spaced apart a distance D3 and the upper wall 80B of the protrusion 72B and the bottom wall 90 are spaced apart by the same distance D3.

Referring to FIG. 5B, in order to adjust the angular position of the riser 46, and consequently, the datum 52 for locating the crossbar 18, the adjustment assembly 50 is actuated to rotate one of the adjustment fasteners 110A, 110B in one of the first direction C1 or the second direction C2 while the other of the adjustment fasteners 110A, 110B is not rotated. The rotation of one of the adjustment fasteners 110A, 110B increases or decreases the distance between the upper wall 80A, 80B of the protrusion 72A, 72B, through which the one of the adjustment fasteners 110A, 110B extends, and the bottom wall 90 compared to the distance between the upper wall 80A, 80B of the protrusion 72A, 72B, through which the other of the adjustment fasteners 110A, 110B extends, and the bottom wall 90. The rotation of one of only one of the adjustment fasteners 110A, 110B changes the distance between the protrusion 72A and the bottom wall 90 and the distance between the protrusion 72B and the bottom wall 90. Specifically, the upper wall 80B of protrusion 72B and the bottom wall 90 is spaced apart a distance D4 and the upper wall 80A of protrusion 72A is spaced apart a distance D5 which is greater than the distance D4.

As the rotation of the adjustment fastener 110A increases the distance between the upper wall 80A of the protrusion 72A and the bottom wall 90, compared to the distance between the upper wall 80B of the protrusion 72B of the bottom wall 90, the top wall 88 and the bottom wall 90 of the riser 46 is tilted, rotated and/or angled by an angle θ formed with respect to a horizontal line. As the carriage 92, upon which the datum 52 is located, is connected to the riser 46, the upper surface 94 and the bottom surface 96 of the carriage 92 is also tilted, rotated, and/or angled by the angle θ formed with respect to the horizontal in order to tilt, rotate and/or angle the datum 52.

Accordingly, the location of the datum 52 in the bolster cart width direction can be adjusted inwardly and outwardly in order to position the datum 52 in a predetermined location for use in locating the crossbar 18. Further, the angular adjustment of the riser 46 can be used to adjust the datum 52 to be in the predetermined location in the event that the support arm 64 or bracket 44 is bent, specifically, the base wall 68.

It is appreciated, of course, that in some embodiments, one of the 110A, 110B is rotated in one of the first direction C1 or the second direction C2 and the other of the 110A, 110B is rotated in the other of the first direction C1 or the second direction C2 to tilted, rotate, and/or angle the datum 52 with respect to the horizontal line.

In some embodiments, the horizontal line is a line parallel with the floor 30 or the bolster cart width direction. In some other embodiments, the horizontal line is generally normal to the bolster cart vertical direction and/or a gravitational direction. In some other embodiments, the horizontal line is parallel with at least one of the upper walls 80A, 80B and lower walls 82A, 82B of the protrusions 72A, 72B, the upper surface 94 and the bottom surface 96 of the carriage 92.

Figure 6:
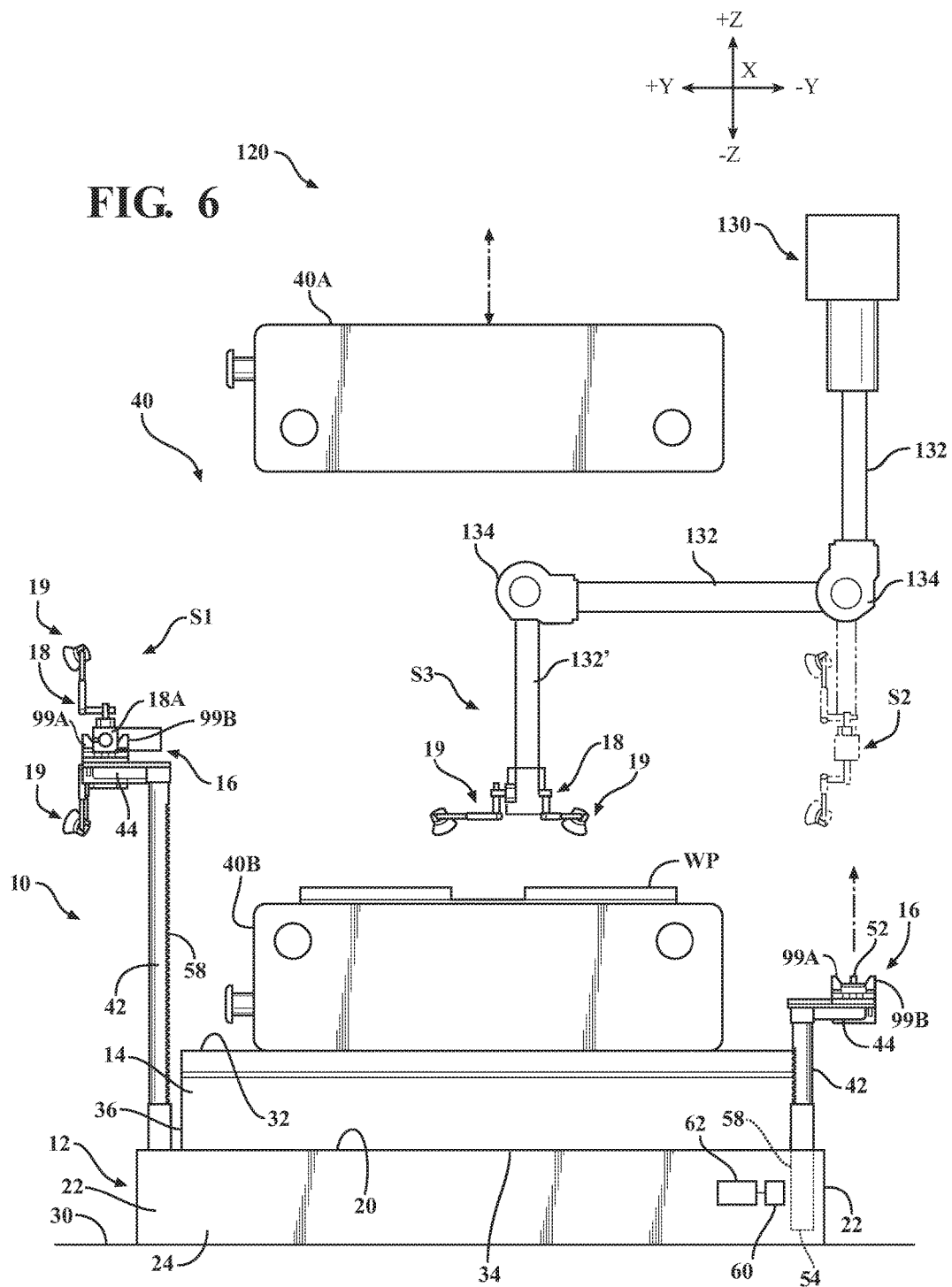
FIG. 6 schematically depicts a front view of the bolster cart assembly of FIG. 1 in the transfer press assembly, according to one or more embodiments shown and described herein.

Referring to FIG. 6, in order to facilitate a better understanding of the connection between the crossbar 18 and the crossbar support assemblies 16, the operation of a transfer press assembly 120 will now be discussed. The transfer press assembly 120 includes the bolster cart assembly 10 and a crossbar transfer mechanism 130. The crossbar transfer mechanism 130 includes a plurality of arm members 132 interconnected by a plurality of articulating joints 134. The crossbar transfer mechanism 130 is utilized to engage the crossbar 18, manipulate the crossbar 18 to attached to and transfer a work piece WP from a current press station at the current bolster cart assembly 10 to a subsequent press station at a subsequent bolster cart assembly (not shown).

Initially, the crossbar 18 is supported by the crossbar support assemblies 16 in the predetermined location at stage S1. Specifically, the crossbar 18 is seated on the carriage 92 with the datum 52 positioned within a locating aperture 17 formed on an underside of the crossbar, as best shown in FIG. 4B. The engagement of the datum 52 within the locating aperture 17 positions the crossbar 18 at the predetermined location of the datum 52. The crossbar transfer mechanism 130 includes the predetermined location of the datum 52.

The crossbar transfer mechanism 130 is articulated to position an engagement arm 132' to the predetermined location to engage with the engage the ends 18A, 18B of the crossbar 18. Upon engagement of the engagement arm 132' and the ends 18A, 18B of the crossbar 18, the motor 62 is actuated to rotate the pinion gear 60 that engages with the rack gear 58 on the support post 42 to lower the support post 42 at stage S2. The lowering of the support post 42 of the crossbar support assembly 16 allows the crossbar transfer mechanism 130 to support the crossbar 18 due to engagement of the engagement arm 132' and the ends 18A, 18B of the crossbar 18, as shown in stage S2.

The crossbar transfer mechanism 130 actuates the articulating joints 134 to manipulate the crossbar 18 such that the crossbar 18 can engage the suction cup assemblies 19 to the work piece WP when the upper press die 40A has been raised, as shown in stage S3. The crossbar transfer mechanism 130 actuates the articulating joints 134 to manipulate the crossbar 18, with the work piece WP attached to the suction cup assemblies 19, to insert the work piece WP into between an upper die and a lower die of a subsequent press station at a subsequent bolster cart assembly.

Upon completion of the pressing operation at the transfer press assembly 120, the crossbar transfer mechanism 130 actuates the articulating joints 134 to manipulate the crossbar 18 to the predetermined location such that the guides 99A, 99B guide the locating aperture 17 of the crossbar 18 into engagement with the datum 52. As the datum 52 is used to locate the crossbar 18 by being inserted into the locating aperture 17, the datum 52 is required to be position within the predetermined location. In situations where the datum 52 is deviated from the predetermined location, the crossbar transfer mechanism 130 is unable to engage with or disengage from the crossbar 18 as the crossbar 18, supported by the crossbar support assemblies 16, is deviated from the predetermined location.

The bolster cart assembly 10 and the crossbar support assembly 16 of the present disclosure provide for the linear and/or angular adjustment of the location of the datum 52 by actuating the adjustment assembly 50 when the lock assembly 48 is in the unlocked configuration. As the datum 52 is configured to locate the crossbar 18 in the predetermined location, the datum 52 the linear and/or angular adjustment of the datum 52 is provided to position the datum 52 into a position so as to locate the crossbar 18 in the predetermined location. Once the datum 52 is adjusted into the position to locate the crossbar 18 within the predetermined location, due to the adjustment of the riser 46, the lock assembly 48 is switched from the unlocked configuration to the locked configuration to inhibit the riser 46 from moving with respect to the bracket 44.

Referring to FIG. 7, a crossbar support assembly is generally illustrated at 216. The crossbar support assembly 216 is utilized in a bolster cart assembly 10. The crossbar support assembly 216 includes a support post 42, a bracket 244, a riser 246, a lock assembly 248, and an adjustment assembly 50. The bracket 244 includes a base wall 268 and a sidewall 270. The crossbar support assembly 216 is similar to the crossbar support assembly 16, except that the pair of elongated slots 78A, 78B are formed in the riser 246 and the internally threaded bores 100A, 100B are formed in the sidewall 270 of the bracket 244. Specifically, the riser 246 includes a pair of elongated slots 278A, 278B that extend between an exterior wall 286 and an opposite interior wall 285 of the riser 246. The sidewall 270 includes a pair of internally threaded bores 200A, 200B that extend through the sidewall 270 from an exterior surface 276 towards an opposite interior surface 274.

The lock assembly 248 includes the washers 108A, 108B, the locking fasteners 102A, 102B that extends through the elongated slots 278A, 278B and into the internally threaded bores 200A, 200B. The lock assembly 248 is switchable between a locked configuration and an unlocked configuration. In the unlocked configuration of the lock assembly 248, the locking fasteners 102A, 102B extend through the elongated slots 278A, 278B and are at least partially received within the internally threaded bores 200A, 200B such that the riser 246 is connected to the bracket 244 while the riser 246 permitted to move with respect to the bracket 244. In the locked configuration, the lock assembly 248 inhibits the riser 246 from moving with respect to the bracket 244. Specifically, the locking fasteners 102A, 102B compress the interior wall 285 of the riser 246 against the exterior surface 276 of the sidewall 270 to inhibit the riser 246 from moving with respect to the bracket 44.

Referring to FIG. 8, a crossbar support assembly is generally illustrated at 316. The crossbar support assembly 316 is utilized in a bolster cart assembly 10. The crossbar support assembly 316 includes a support post 42, a bracket 44, a riser 346, a lock assembly 348, and an adjustment assembly 50. The crossbar support assembly 16 is similar to the crossbar support assembly 16, except that the internally threaded bores 100A, 100B are replaced with a pair of integrally formed locking fasteners 302A, 302B. Specifically, the riser 346 includes the pair of integrally formed locking fasteners 302A, 302B that include externally threaded shafts 306A, 306B that extend outwardly from the interior wall 385 of the riser 346. In some embodiment, the locking fasteners 302A, 302B are formed integrally as a one piece monolithic structure with the riser 346.

The lock assembly 348 includes the washers 108A, 108B, the locking fasteners 302A, 302B, specifically, the externally threaded shafts 306A, 306B, and a pair of internally threaded nuts 322A, 322B. The lock assembly 348 is switchable between a locked configuration and an unlocked configuration. In the unlocked configuration of the lock assembly 348, the locking fasteners 302A, 202B extend through the elongated slots 78A, 78B and are at least partially received within the internally threaded nuts 322A, 322B such that the riser 346 is connected to the bracket 44 while the riser 346 is permitted to move with respect to the bracket 44. In the locked configuration, the lock assembly 348 inhibits the riser 346 from moving with respect to the bracket 44. Specifically, the locking fasteners 302A, 302B compress the interior wall 385 of the riser 346 against the exterior surface 76 of the sidewall 70 to inhibit the riser 346 from moving with respect to the bracket 44.

It is appreciated, that in some embodiments the lock assembly may include only a single elongated slot formed in the sidewall, a single locking fastener, and a single internally threaded bore formed in the riser. In some other embodiments, the adjustment assembly includes only a single protrusions formed in the bracket, a single internally threaded through-bore formed in the single protrusion, and a single adjustment fastener. In some other embodiments, the lock assembly may include only a single elongated slot formed in the sidewall, a single locking fastener, and a single internally threaded bore formed in the riser, and the adjustment assembly may include only a single protrusions formed in the bracket, a single internally threaded through-bore formed in the single protrusion, and a single adjustment fastener. In still some other embodiments, the bracket may only include a single protrusion that includes the pair of internally threaded through-bores.

While particular embodiments have been illustrated and described herein, it should be understood that various other changes and modification may be made without departing from the spirit and scope of the claimed subject matter. Moreover, although various aspects of the claimed subject matter have been described herein, such aspect need not be utilized in combination. It is therefore intended that the appended claims cover all such changes and modifications that are within the scope of the claimed subject matter.

What is claimed:

1. A crossbar support assembly that supports a crossbar, the crossbar support assembly comprising:
   a support post;
   a bracket secured to a distal end of the support post;
   a riser having a datum configured to locate the crossbar in a predetermined location;
   a lock assembly configured to releasably secure the riser to the bracket, the lock assembly includes a locked configuration and an unlocked configuration, in the locked configuration the riser is inhibited from moving with respect to the bracket, and in the unlocked configuration the riser is permitted to move with respect to the bracket; and
   an adjustment assembly that adjusts a position of the riser with respect to the bracket when the lock assembly is in the unlocked configuration.

2. The crossbar support assembly of claim 1, wherein the bracket includes a first protrusion that includes an upper wall and an opposite lower wall, the upper wall of the first protrusion faces a bottom wall of the riser.

3. The crossbar support assembly of claim 2, wherein the adjustment assembly includes a first adjustment fastener and a first through-bore formed in the first protrusion, the first through-bore extends between the lower wall and the upper wall of the first protrusion, the first adjustment fastener extends through the first through-bore of the first protrusion and abuts the bottom wall of the riser,
   wherein when the lock assembly is in the unlocked configuration, rotation of the first adjustment fastener in a first direction displaces the riser with respect to the first protrusion to increase a distance between the upper wall of the first protrusion and the bottom wall of the riser, and
   wherein when the lock assembly is in the unlocked configuration, rotation of the first adjustment fastener in a second direction opposite the first direction displaces the riser with respect to the first protrusion to decrease the distance between the upper wall of the first protrusion and the bottom wall of the riser.

4. The crossbar support assembly of claim 3, wherein the bracket includes a second protrusion that includes an upper wall and an opposite lower wall, the upper wall of the second protrusion faces the bottom wall of the riser,
   wherein the adjustment assembly includes a second adjustment fastener and a second through-bore formed in the second protrusion, the second through-bore extends between the lower wall and the upper wall of the second protrusion, the second adjustment fastener extends through the second through-bore of the second protrusion and abuts the bottom wall of the riser,
   wherein when the lock assembly is in the unlocked configuration, rotation of one of the first adjustment fastener or the second adjustment fastener in one of the first direction or the second direction rotates the riser to angle the bottom wall of the riser with respect to the upper wall of the first protrusion and the upper wall of the second protrusion.

5. The crossbar support assembly of claim 3, wherein the bracket includes a base wall and a sidewall that extends generally normal from the base wall, the sidewall includes an interior surface and an opposite exterior surface, the first protrusion extends outwardly from the exterior surface of the sidewall, and
   wherein the riser includes an interior wall and an opposite exterior wall.

6. The crossbar support assembly of claim 5, wherein the lock assembly includes a locking fastener, an elongated slot that extends from the interior surface of the sidewall to the exterior surface of the sidewall, and a bore formed in the interior wall of the riser,
   wherein in the locked configuration the locking fastener extends through the elongated slot formed in the sidewall and the locking fastener is partially received within the bore of the riser to secure the riser to the sidewall of the bracket to inhibit the riser from moving with respect to the bracket,
   wherein in the unlocked configuration the locking fastener extends through the elongated slot formed in the sidewall and the locking fastener is partially received within the bore of the riser to connect the riser to the sidewall of the bracket while permitting the riser to slide with respect to the sidewall.

7. The crossbar support assembly of claim 5, wherein the lock assembly includes a locking fastener, an elongated slot that extends from the interior wall of the riser to the exterior wall of the riser, and a bore formed in the exterior surface of the sidewall,
   wherein in the locked configuration the locking fastener extends through the elongated slot formed in the riser and the locking fastener is partially received within the bore of the sidewall to secure the riser to the sidewall of the bracket to inhibit the riser from moving with respect to the bracket,
   wherein in the unlocked configuration the locking fastener extends through the elongated slot formed in the riser and the locking fastener is partially received within the bore of the sidewall to connect the riser to the sidewall of the bracket while permitting the riser to slide with respect to the sidewall.

8. A bolster cart assembly for use in a transfer press assembly, the bolster cart assembly comprising:
   a bolster cart configured to receive a bolster;
   a crossbar; and
   a crossbar support assembly configured to support the crossbar, the crossbar support assembly includes a support post, a bracket, a riser, a lock assembly, and an adjustment assembly, the support post includes a distal end and is connected to the bolster cart, the bracket is secured to the distal end of the support post, the riser includes a datum configured to locate the crossbar in a predetermined location, the lock assembly releasably secures the riser to the bracket, the lock assembly includes a locked configuration and an unlocked configuration, in the locked configuration the riser is inhibited from moving with respect to the bracket, and in the unlocked configuration the riser is permitted to move with respect to the bracket, the adjustment assembly adjusts a position of the riser with respect to the bracket when the lock assembly is in the unlocked configuration.

9. The bolster cart assembly of claim 8, wherein the bracket includes a first protrusion that includes an upper wall and an opposite lower wall, the upper wall of the first protrusion faces a bottom wall of the riser.

10. The bolster cart assembly of claim 9, wherein the adjustment assembly includes a first adjustment fastener and a first through-bore formed in the first protrusion, the first through-bore extends between the lower wall and the upper wall of the first protrusion, the first adjustment fastener extends through the first through-bore of the first protrusion and abuts the bottom wall of the riser, wherein when the lock assembly is in the unlocked configuration, rotation of the first adjustment fastener in a first direction displaces the riser with respect to the first protrusion to increase a distance between the upper wall of the first protrusion and the bottom wall of the riser, and wherein when the lock assembly is in the unlocked configuration, rotation of the first adjustment fastener in a second direction opposite the first direction displaces the riser with respect to the first protrusion to decrease the distance between the upper wall of the first protrusion and the bottom wall of the riser.

11. The bolster cart assembly of claim 10, wherein the bracket includes a second protrusion that includes an upper wall and an opposite lower wall, the upper wall of the second protrusion faces the bottom wall of the riser, wherein the adjustment assembly includes a second adjustment fastener and a second through-bore formed in the second protrusion, the second through-bore extends between the lower wall and the upper wall of the second protrusion, the second adjustment fastener extends through the second through-bore of the second protrusion and abuts the bottom wall of the riser, wherein when the lock assembly is in the unlocked configuration, rotation of one of the first adjustment fastener or the second adjustment fastener in one of the first direction or the second direction rotates the riser to angle the bottom wall of the riser with respect to the upper wall of the first protrusion and the upper wall of the second protrusion.

12. The bolster cart assembly of claim 10, wherein the bracket includes a base wall and a sidewall that extends generally normal from the base wall, the sidewall includes an interior surface and an opposite exterior surface, the first protrusion extends outwardly from the exterior wall of the sidewall, and wherein the riser includes an interior wall and an opposite exterior wall.

13. The bolster cart assembly of claim 12, wherein the lock assembly includes a locking fastener, an elongated slot that extends from the interior surface of the sidewall to the exterior surface of the sidewall, and a bore formed in the interior wall of the riser, wherein in the locked configuration the locking fastener extends through the elongated slot formed in the sidewall and the locking fastener is partially received within the bore of the riser to secure the riser to the sidewall of the bracket to inhibit the riser from moving with respect to the bracket, wherein in the unlocked configuration the locking fastener extends through the elongated slot formed in the sidewall and the locking fastener is partially received within the bore of the riser to connect the riser to the sidewall of the bracket while permitting the riser to slide with respect to the sidewall.

14. The bolster cart assembly of claim 12, wherein the lock assembly includes a locking fastener, an elongated slot that extends from the interior wall of the riser to the exterior wall of the riser, and a bore formed in the exterior surface of the sidewall, wherein in the locked configuration the locking fastener extends through the elongated slot formed in the riser and the locking fastener is partially received within the bore of the sidewall to secure the riser to the sidewall of the bracket to inhibit the riser from moving with respect to the bracket, wherein in the unlocked configuration the locking fastener extends through the elongated slot formed in the riser and the locking fastener is partially received within the bore of the sidewall to connect the riser to the sidewall of the bracket while permitting the riser to slide with respect to the sidewall.

15. A method of adjusting a datum that locates a crossbar on a support post of a bolster cart of a transfer press assembly, the datum is provided on a riser that is connected to a bracket by a lock assembly, the datum is configured to locate the crossbar in a predetermined location, the bracket is secured to a distal end of the support post that extends from the bolster cart, the method comprising:

switching the lock assembly from a locked configuration to an unlocked configuration, the lock assembly is configured to releasably secure the riser to the bracket that is secured to the distal end of the support post, in the locked configuration the riser is inhibited from moving with respect to the bracket, and in the unlocked configuration the riser is permitted to move with respect to the bracket; and actuating an adjustment assembly that adjusts a position of the riser with respect to the bracket when the lock assembly is in the unlocked configuration.

16. The method of claim 15, wherein the bracket includes a base wall, a sidewall, and a first protrusion, the sidewall extends generally normal from the base wall, the sidewall includes an interior surface and an opposite exterior surface, the first protrusion extends outwardly from the sidewall, the first protrusion includes an upper wall and an opposite lower wall, the upper wall of the first protrusion faces a bottom wall of the riser, wherein the adjustment assembly includes a first adjustment fastener and a first through-bore formed in the first protrusion, the first through-bore extends between the lower wall and the upper wall of the first protrusion, the first adjustment fastener extends through the first through-bore of the first protrusion and abuts the bottom wall of the riser, wherein when the lock assembly is in the unlocked configuration, rotation of the first adjustment fastener in a first direction displaces the riser with respect to the first protrusion to increase a distance between the upper wall of the first protrusion and the bottom wall of the riser, and wherein when the lock assembly is in the unlocked configuration, rotation of the first adjustment fastener in a second direction opposite the first direction displaces the riser with respect to the first protrusion to decrease the distance between the upper wall of the first protrusion and the bottom wall of the riser.

17. The method of claim 16, wherein the bracket includes a second protrusion that extends outwardly from the sidewall, the second protrusion include an upper wall and an opposite lower wall, the upper wall of the second protrusion faces the bottom wall of the riser, wherein the adjustment assembly includes a second adjustment fastener and a second through-bore formed in the second protrusion, the second through-bore extends between the lower wall and the upper wall of the second protrusion, the second adjustment fastener extends through the second through-bore of the second protrusion and abuts the bottom wall of the riser, wherein when the lock assembly is in the unlocked configuration, rotation of one of the first adjustment fastener or the second adjustment fastener in one of the first direction or the second direction rotates the riser to angle the bottom wall of the riser with respect to the upper wall of the first protrusion and the upper wall of the second protrusion.

18. The method of claim 16, wherein the lock assembly includes a locking fastener, an elongated slot that extends through one of the sidewall or the riser, and a bore formed in the other of the sidewall or the riser, wherein in the locked configuration the locking fastener extends through the elongated slot formed in the one of the sidewall or the riser and the locking fastener is partially received within the bore formed in the other of the sidewall or the riser to secure the riser to the sidewall of the bracket to inhibit the riser from moving with respect to the bracket, and wherein in the unlocked configuration the locking fastener extends through the elongated slot formed in one of the sidewall or the riser and the locking fastener is partially received within the bore formed in the other of the sidewall and the riser to connect the riser to the sidewall of the bracket while permitting the riser to slide with respect to the sidewall.

* * * * *